United States Patent [19]

LeMaux et al.

[11] Patent Number: 5,279,345
[45] Date of Patent: Jan. 18, 1994

[54] STUMP CUTTER BRACKET

[75] Inventors: Richard G. LeMaux, Warren, Mich.; Daniel R. Falatok, Lake Moore, S.C.

[73] Assignee: Border City Tool & Manufacturing Co., Warren, Mich.

[21] Appl. No.: 990,680

[22] Filed: Dec. 15, 1992

[51] Int. Cl.$^5$ .............. B27G 13/04; B27C 1/00; A01G 23/06
[52] U.S. Cl. .................. 144/235; 144/2 N; 144/231; 144/241; 37/94; 299/93; 407/46
[58] Field of Search .............. 37/2 R, 94, 142.5, 144/2 N, 218, 224, 225, 231, 235, 241; 299/79, 299/88, 89, 90, 91, 93; 407/46, 33, 34, 101

[56] References Cited

U.S. PATENT DOCUMENTS

| | | |
|---|---|---|
| 3,844,619 | 10/1974 | Haller . |
| 4,074,447 | 2/1978 | Shivers, Jr. et al. .............. 144/2 N |
| 4,492,140 | 1/1985 | Pano .................. 407/46 |
| 4,759,394 | 7/1988 | Clemenson .............. 144/2 N |
| 4,974,649 | 12/1990 | Manning .............. 144/2 N |
| 4,998,574 | 3/1991 | Beach et al. .............. 144/2 N |
| 5,005,622 | 4/1991 | Beach et al. .............. 144/2 N |
| 5,135,035 | 8/1992 | Mills .................. 407/46 |

OTHER PUBLICATIONS

Vermeer, "Pro Series" Stump Cutter Tool.
Vermeer, Parts lists and Instruction Manual for Model 6 and 630 pp. 7-9, in particular.

Primary Examiner—W. Donald Bray
Attorney, Agent, or Firm—Dykema Gossett

[57] ABSTRACT

An improved bracket clamps a cutting tool to the wheel of a stump cutting apparatus and includes a channel defined between a leading bracket half and a trailing bracket half. The trailing bracket half includes an extension extending outwardly beyond an outermost edge of the leading bracket half. The channel encloses at least two-thirds of the cutting tool, and the extension has a planar surface in engagement with the surface of the cutting tool proximate to the cutting tip when the other end of the cutting tool is aligned with the opposing end of the channel. The extension provides rearward support for the cutting tip.

11 Claims, 2 Drawing Sheets

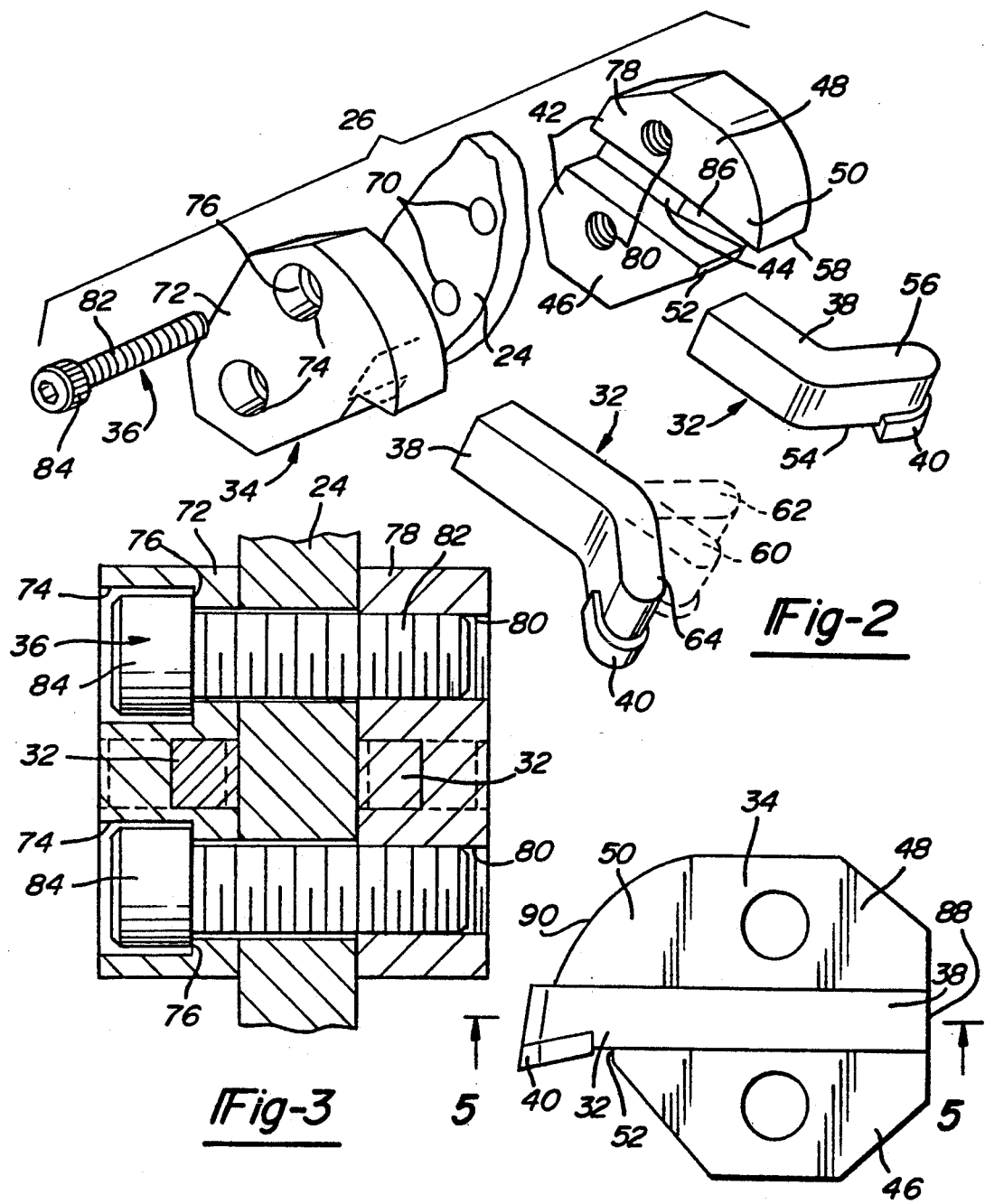

STUMP CUTTER BRACKET

BACKGROUND OF THE INVENTION

This invention relates generally to a bracket used in securing a cutting tool to a device used in removing tree stumps.

A tree stump cutting device typically comprises a rotatable wheel having a plurality of cutting tools mounted radially about the wheel. The cutting tools act as teeth, chipping away portions of the tree stump. The conventional cutting tool comprises a uniformly-shaped alloy steel shaft and a carbide tip that provides the actual cutting surface. These cutting tools are clamped to the rotating wheel by use of brackets, known also as "pockets" in the industry. When clamped to the wheel, the cutting tool extends radially outwardly beyond the bracket to place the carbide tip into a proper cutting orientation.

Due to normal wear and the rough conditions to which these cutting tools are subjected, the cutting tool must be continually replaced. In addition, the shaft of the cutting tool may shear if the cutting tool encounters a particularly hard material, as often happens.

Several efforts have been made to reinforce and enlarge the shaft portion of the cutting tool to perform heavy duty stump cutting operations. These modifications to the cutting tool have proven successful in extending the life of the cutting tool, but result in a significantly more expensive cutting tool. Due to normal wear of the carbide tip, all cutting tools need regular replacement.

Although there have been several efforts in reinforcing the cutting tool itself, few efforts have been made to provide a bracket which serves to reinforce the conventional cutting tool. A reinforcing bracket would permit the conventional cutting tool to perform under heavy duty conditions. Additionally, the reinforcing bracket need not be replaced frequently. Reinforcing brackets will need replacement far less than reinforced cutting tools, and allow the use and periodic replacement of relatively inexpensive non-reinforced cutting tools.

SUMMARY OF THE INVENTION

The present invention discloses a reinforcing bracket used in clamping a conventional cutting tool to a wheel of a stump cutting apparatus. The conventional cutting tool comprises a uniformly-shaped shaft and a cutting tip at one end of the shaft.

The bracket comprises a body having a channel which extends along a longitudinal axis, and is adapted to enclose the cutting tool when clamped to the wheel. The channel is formed between a leading bracket half and a trailing bracket half, defined relative to the rotation of the wheel. The trailing bracket half includes an extension extending outwardly beyond an outermost edge of the leading bracket half. The extension has a planar surface in contact with a rearward surface of the cutting tool proximate to the cutting tip. Preferably, the channel of the bracket encloses at least two thirds of the shaft when clamped to the wheel, providing solid support for the cutting tool.

In a most preferred embodiment of the present invention, the ratio of the length of the channel to the length of the channel plus the extension of the trailing bracket half is no less than 0.70. Preferably the length of the channel varies between 6.0 cm and 7.2 cm, and the channel plus the extension varies between 7.5 cm and 9.0 cm. In a preferred embodiment, the length of the channel is 6.8 cm, and the channel plus extension is 8.1 cm.

In another feature of the invention, the extension is preferably positioned rearwardly of at least a portion of the cutting tip when the cutting tool is positioned such that its other end is aligned with the remote end of the channel.

The reinforcing bracket allows the tool to perform under heavy duty conditions by providing reinforcement to the cutting tip, and significantly extends the operational life of the conventional cutting tool.

BRIEF DESCRIPTION OF DRAWINGS

Various features of the present invention will become more apparent upon reading the following detailed description of the preferred embodiments, along with the appended claims in conjunction with the accompanying drawings, wherein identical reference numerals identify like features, and:

FIG. 2 is an exploded view of a cutting assembly;

FIG. 3 is a partial cross-sectional view taken substantially along line 3—3 of FIG. 1;

FIG. 4 is a planar view of a bracket and cutting tool;

FIG. 5 is a cross-sectional view taken substantially along line 5—5 of FIG. 4;

DETAILED DESCRIPTION OF THE PREFERRED EMBODIMENT

Figure 1:
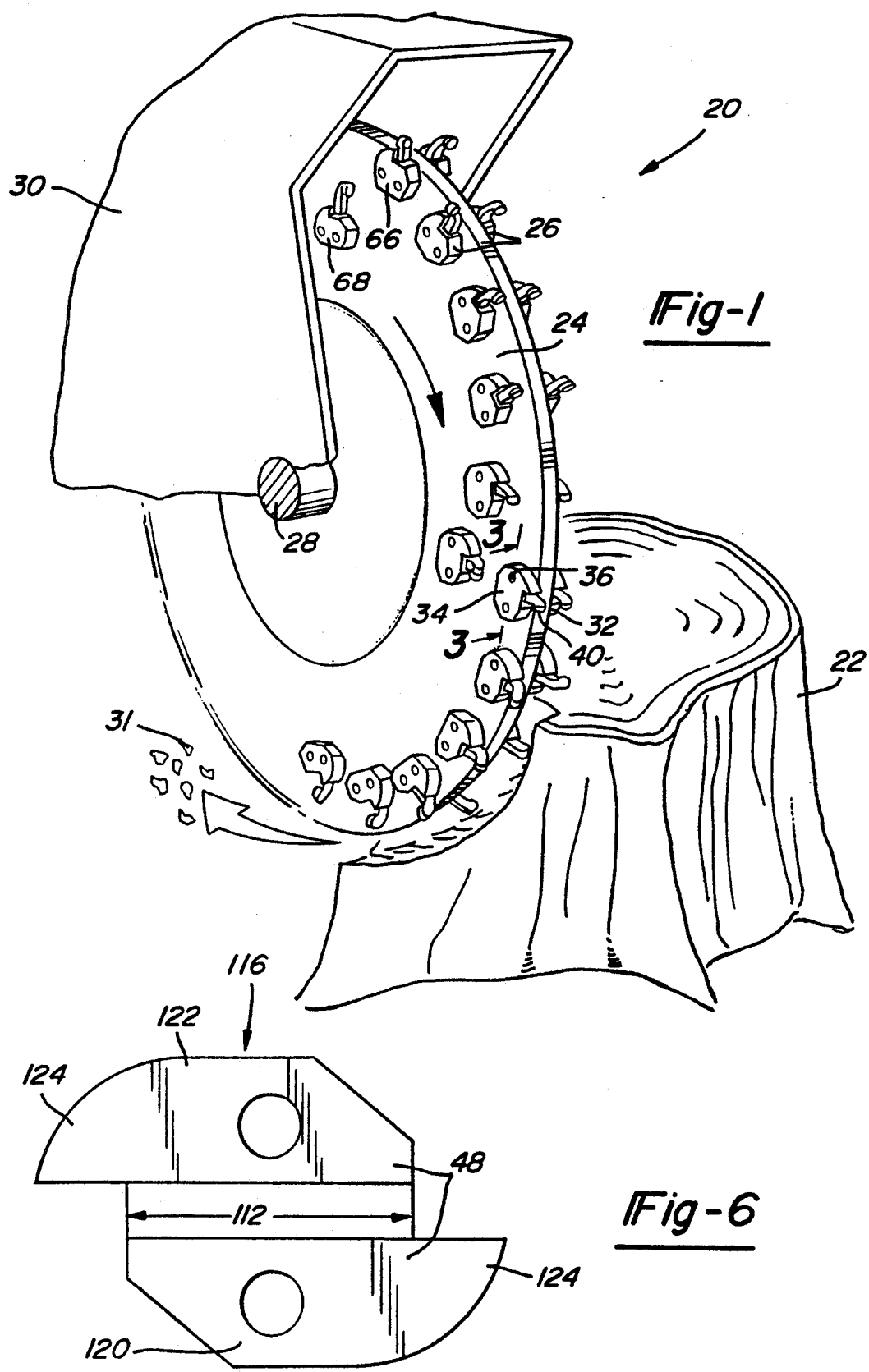
FIG. 1 is a perspective view of a tree stump cutting apparatus incorporating the present invention.

A stump cutting apparatus 20 is shown in FIG. 1 removing a tree stump 22. Stump cutting apparatus 20 includes a wheel 24 having cutting assemblies 26, and driven to rotate about an axis of rotation 28 by a motor (not shown). Cutting apparatus 20 further includes a shield 30 partially enclosing wheel 24 to protect an operator from wood chips 31, or other debris, produced by operation of the cutting apparatus 20.

Referring now to FIG. 1, each cutting assembly 26 comprises a cutting tool 32 clamped to wheel 24 by a reinforcing bracket 34. Pairs of cutting assemblies 26 are shown clamped to opposite sides of wheel 24 by a clamping means, or bolts 36. Bracket 34 is designed to provide reinforcement for a conventional cutting tool 32, adapting it for heavy duty performance. Cutting tool 32 has a uniformly-shaped shaft 38 and a cutting tip 40 at one end of the shaft 38. Bracket 34 reinforces a rearward portion of cutting tool 32, in proximity to cutting tip 40.

As shown in FIG. 2, bracket 34 comprises a body 42 having a channel 44 extending along a longitudinal axis. Channel 44 is adapted to enclose at least two thirds of cutting tool 32 when clamped to wheel 24, providing solid support for the cutting tool during cutting operations. Channel 44 extends between a leading bracket half 46 and a trailing bracket half 48, defined by the relative rotation of wheel 24. Trailing bracket half 48 includes an extension 50 extending outwardly beyond an outermost edge 52 of leading bracket half 46. Cutting tool 32 has a leading surface 54, also defined by relative rotation of wheel 24, and a trailing surface 56 opposite leading surface 54.

Extension 50 has a planar surface 58 which engages trailing surface 56 of cutting tool 32 at a location aligned with cutting tip 40. When assembly 26 is clamped to wheel 24, extension 50 provides additional support for the rearward portion of cutting tip 40, significantly extending the life of cutting tool 32. Cutting tip 40 is mounted on leading surface 54 of cutting tool 32, and extends radially outwardly of bracket 34. Shaft 38 is typically conventional steel, and cutting tip 40 is carbide.

As shown in FIG. 1, cutting tools 32 are spaced about the circumference of wheel 24 to create a full cut pattern that provides clearance for wheel 24 and cutting assemblies 26 through tree stump 22. To form the full cut pattern, some cutting tools 32 are formed straight as indicated at 60, some bend towards wheel 24 as indicated at 62, and some bend away from wheel 24 as indicated at 64 (see FIG. 2). In addition, some cutting tools 32 are secured to wheel 24 at radially outer positions of wheel 24 indicated at 66, and at radially inner positions of wheel 24 indicated at 68.

An additional feature of bracket 34 is that cutting tool 32 may be adjusted slightly radially outwardly or radially inwardly within channel 44 to fine tune the full cut pattern. Prior art heavy duty cutting tools do not offer this advantage. When cutting tools 32 are properly aligned around wheel 24 forming the full cut pattern, cutting apparatus 20 operates more efficiently, and the life of cutting tool 32 is extended.

Referring now to FIG. 3, each cutting assembly 26 is clamped to wheel 24 through a pair of apertures 70 formed in wheel 24. A first bracket 72 includes apertures 74 that are countersunk to form a ledge 76. A corresponding second bracket 78 includes apertures 80 that are threaded. Bolts 36 extend through aligned apertures 70, 74, and 80. Each bolt 36 includes a threaded shaft 82, and a head 84. Threaded shaft 82 is threadably received within aperture 80, while head 70 is received in countersunk portion of aperture 74 and prevented from moving through aperture 74 by ledge 76.

FIG. 4 illustrates cutting tool 32 received in channel 44 of bracket 34. Channel 44 is generally U-shaped and defined by a floor 88 extending along a longitudinal axis, with leading bracket half 46 and trailing bracket half 48 extending from an edge of floor 88. Leading bracket half 46 and trailing bracket half 48 are laterally spaced defining a width of floor 88.

As shown in FIG. 5, a sloped portion 111 of channel 44 permits cutting tools 32 having a bend away from wheel 24 to be properly inserted in channel 44. A channel length 112 is defined by the longitudinal length of channel 44, defined as the dimension extending along leading bracket half 46. An extension length 114 is defined by the longitudinal length of channel 44 plus the additional length provided by extension 50, which is defined as the dimension extending along trailing bracket half 48. In a preferred embodiment, the ratio of channel length 112 to extension length 114 is no less than 0.70. In one embodiment, channel length 112 is 6.8 cm and extension length 114 is 8.1 cm. Preferably, channel length 112 varies between 6.0 cm and 7.2 cm, and extension length 114 varies between 7.5 cm and 9.0 cm.

Figure 6:
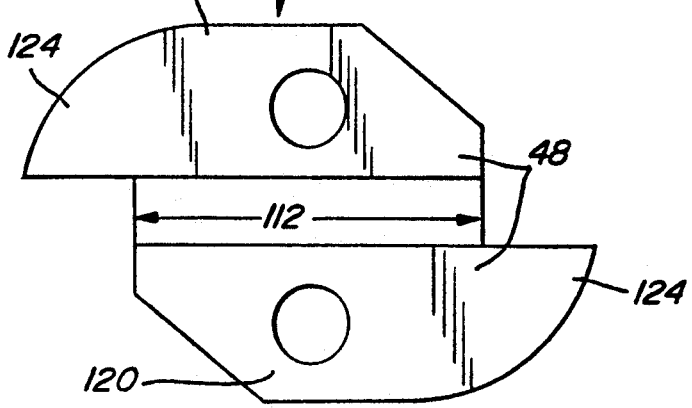
FIG. 6 is a planar view of an alternate embodiment of the bracket.

FIG. 6 shows an alternative reversible bracket 116 embodiment which includes a body 118 having a leading bracket half 120, and a trailing bracket half 122. Each bracket half includes an extension 124 extending outwardly beyond an outermost edge of the opposing bracket half. The ratio of the channel length 112 to the extension length is similar in both embodiments. The second extension 124 functions only when bracket is rotated 180 degrees. This embodiment essentially permits both bracket halves to function as the trailing bracket half. In the event one extension 124 is damaged, bracket 116 is rotated 180 degrees and re-clamped to wheel 24, providing additional life to bracket 116.

With both embodiments, the bracket body is formed of low carbon steel. The material used for the extension 50 may be hardened, or formed of a stronger grade steel. Preferably, however, the body is made of a uniform material. The conventional cutting tool 32 comprises a uniformly-shaped shaft 38 formed of alloy steel and includes a carbide tip 40.

Preferred embodiments of the present invention have been described, however, it is to be understood that variations and modifications may be employed without departing from scope of the present invention. The scope of the invention should be determined by reference to the following claims.

We claim:

1. A stump cutting apparatus comprising:
   a wheel rotatable about an axis of rotation;
   at least one bracket having a channel extending along a longitudinal axis between first and second ends, and defined between a leading bracket half and a trailing bracket half, said trailing bracket half including an extension extending outwardly beyond an outermost edge of said leading bracket half and said second end of said channel; and
   a cutting tool including a shaft and a cutting tip at one end of the shaft, said cutting tool received in said channel, said bracket clamping said cutting tool on said wheel, said cutting tip being on a radially outer portion of said shaft, and towards said leading bracket half, said cutting tool having a trailing surface opposing said cutting tip, said extension having a planar surface in contact with a portion of said trailing surface of said cutting tool, at least a portion of said cutting tip being at the same radial distance as at least a portion of said planar surface of said extension when a radially inner end of said cutting tool is aligned with said first end of said channel, said extension providing rearward support for said cutting tip of said cutting tool.

2. The stump cutting apparatus of claim 1, wherein said trailing bracket half is in engagement with substantially the entire length of said trailing surface of said cutting tool.

3. The stump cutting apparatus of claim 1, wherein said channel encloses at least two thirds of said cutting tool therein.

4. The stump cutting apparatus of claim 1, wherein said bracket has a first longitudinal length defined by the length of said channel, and a second longitudinal length defined by the length of said channel plus said extension of said trailing bracket half, the ratio of said first longitudinal length to said second longitudinal length being no less than 0.70.

5. The combination of a cutting tool and a bracket for clamping the cutting tool, the combination comprising:
   the cutting tool, including a shaft and a cutting tip; and
   a body having a channel extending along a longitudinal axis between first and second ends, and defined between a leading bracket half and a trailing bracket half, said trailing bracket half including an extension extending outwardly beyond an outermost edge of said leading bracket half and said second end of said channel, said channel receiving said cutting tool, said extension having a planar surface engaging the trailing surface of the cutting tool, said extension being coextensive with at least a portion of the cutting tip so that said extension provides rearward support for the cutting tip.

6. The combination of claim 5, wherein said trailing bracket half is adapted to be in engagement with substantially the entire length of the cutting tool.

7. The combination of claim 5, wherein said channel is intended to enclose at least two thirds of the shaft of the cutting tool therein when the cutting tool is clamped to the wheel.

8. The combination of claim 5, wherein said channel is U-shaped defined by a floor extending along said longitudinal axis, said leading bracket half and said trailing bracket half extending from an edge of said floor.

9. The combination of claim 5, wherein said channel has a first longitudinal length defined by the length of said channel, a second longitudinal length defined by the length of said channel plus said extension of said trailing bracket half, and the ratio of said first longitudinal length so said second longitudinal length being no less than 0.70.

10. The combination of claim 9, wherein said first longitudinal length is approximately 6.8 cm, and said second longitudinal length is approximately 8.1 cm.

11. The combination of claim 9, wherein said first longitudinal length varies between 6.0 cm and 7.2 cm, and said second longitudinal length varies between 7.5 cm and 9.0 cm.

* * * * *